United States Patent [19]

Roberts

[11] Patent Number: 5,579,804
[45] Date of Patent: Dec. 3, 1996

[54] TAMPER-PROOF HANDLE EXTENSION FOR QUARTER TURN VALVES

[75] Inventor: John L. Roberts, Greenfield, Wis.

[73] Assignee: Milwaukee Valve Company, Inc., Milwaukee, Wis.

[21] Appl. No.: 541,687

[22] Filed: Oct. 10, 1995

[51] Int. Cl.$^6$ .................................................. F16K 35/06
[52] U.S. Cl. .............................. 137/385; 70/177; 70/180; 251/288
[58] Field of Search ........................... 137/385; 251/288; 70/177, 180

[56] References Cited

U.S. PATENT DOCUMENTS

| | | | |
|---|---|---|---|
| 4,126,023 | 11/1978 | Smith et al. | 251/288 |
| 4,162,690 | 7/1979 | Anderson | 137/385 |
| 4,756,507 | 7/1988 | McAndrew | 251/292 |
| 4,770,388 | 9/1988 | Carman | 251/288 |
| 5,014,528 | 5/1991 | Roberts | 70/177 |
| 5,183,073 | 2/1993 | Roberts | 137/385 |
| 5,365,759 | 11/1994 | Bonomi | 137/385 |

Primary Examiner—A. Michael Chambers
Attorney, Agent, or Firm—Michael, Best and Friedrich

[57] ABSTRACT

A tamper-proof locking mechanism for a rotatable control device, such as a quarter turn valve, including a valve member connected to a stem rotatably mounted in a body housing the valve member and an operating handle connected to the stem via an elongated extension for rotating the valve member between open and closed positions. The locking mechanism includes a bracket mounted on the body and having a flange spaced outwardly from the body and generally perpendicularly to the rotational axis of the stem and including an aperture through which the extension extends and a pair of circumferentially spaced projections extending radially outwardly relative to the rotational axis of the stem at locations corresponding to the open and closed positions of the valve member. A slider member, slidably mounted on the intermediate portion of the handle for reciprocating movement between locked and unlocked positions, includes a latch element having an opening for receiving the projections and arranged to restrain both rotational and axial movement of the handle when the handle is in the open or closed position and the slider member is in the locked position.

16 Claims, 2 Drawing Sheets

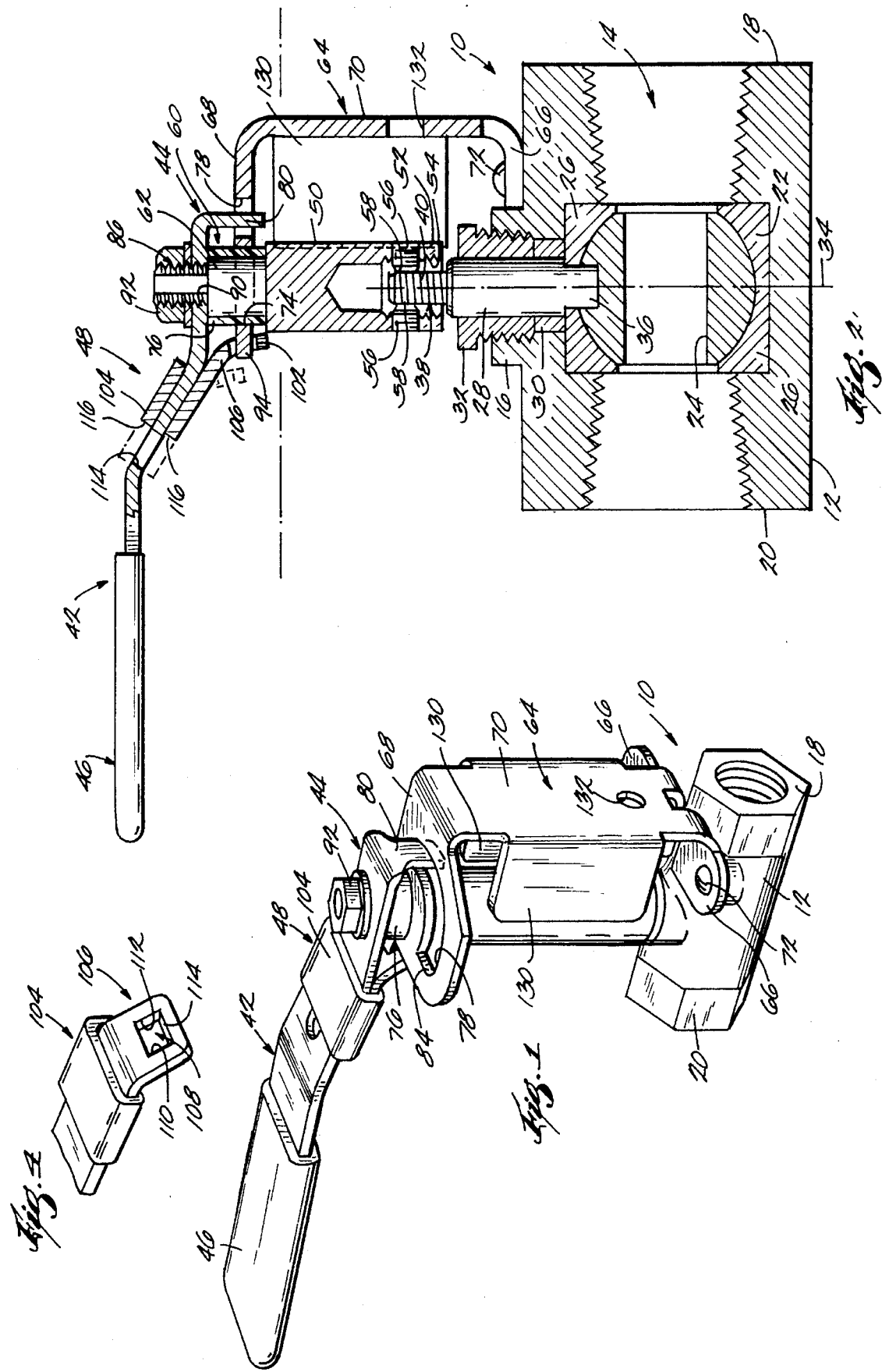

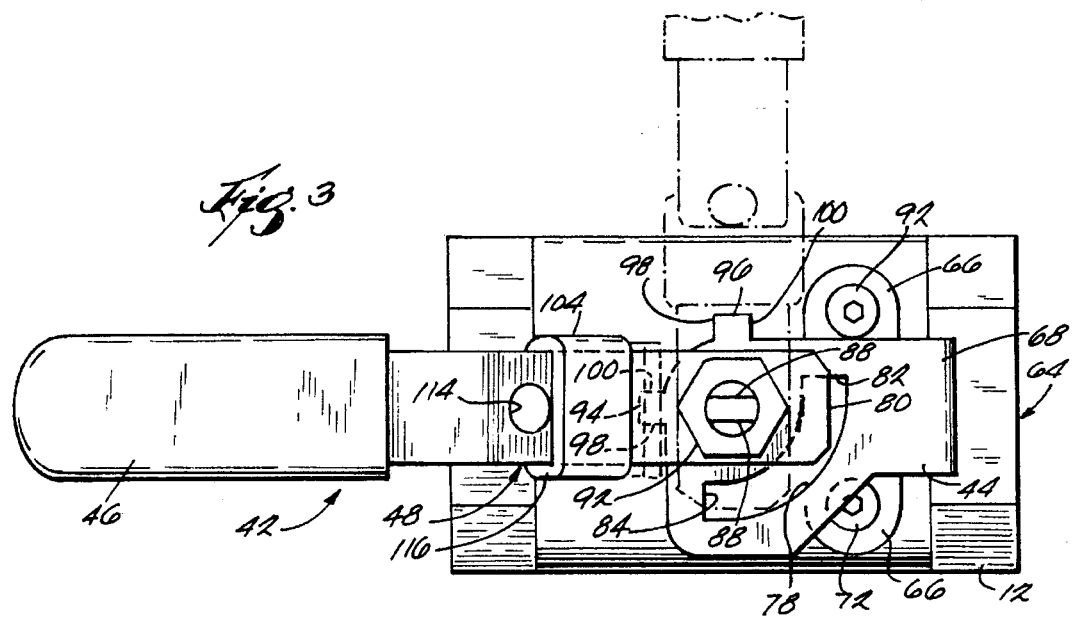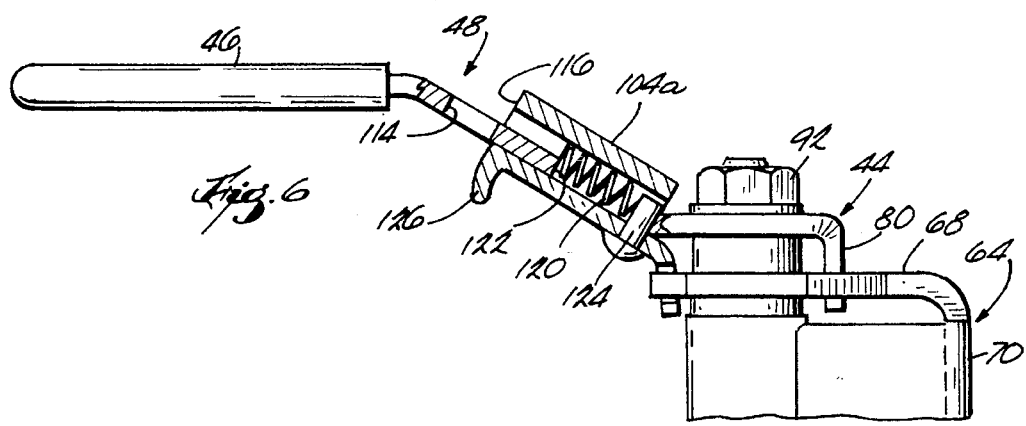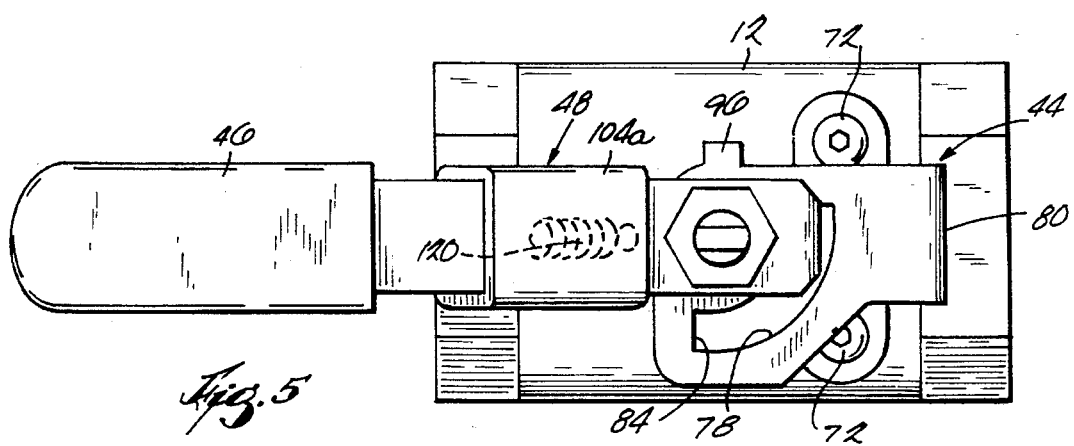

TAMPER-PROOF HANDLE EXTENSION FOR QUARTER TURN VALVES

BACKGROUND OF THE INVENTION

This invention relates to tamper-proof locking mechanisms for controls having a rotatable control shaft projecting outwardly from a body housing a control means and an operating handle extension. In one aspect, the invention relates to tamper-proof locking mechanisms for quarter turn valves having a stem extension, such as ball valves, butterfly valves and plug valves.

Quarter turn valves typically include a valve member rotatably mounted in a valve body, a rotatable shaft or stem connected to the valve member and having an external portion extending outwardly from the valve body and an operating handle connected to the external end portion of the control shaft or stem for moving the valve member between open and closed positions. When this type valve is used in piping systems encased with insulation or situated at a location where it is difficult to reach the operating handle, some kind of extension usually is connected to the external end of the stem in place of the operating handle and the operating handle connected to the outer end of this extension. McAndrew U.S. Pat. No. 4,756,507 discloses an example of such an extension.

In some fluid systems, it is essential that certain manually-operated control valves be maintained in either the full open or full closed position during normal operation. For example, Occupational Safety and Health Administration regulations require that certain control valves in hydraulic and pneumatic systems be positively locked in the open or closed position. Another example is fire protection sprinkler systems where control valves must be full open at all times to insure proper water flow in the event of an emergency.

When such valves are located in areas where there is a risk of intentional tampering or where they can be unintentionally closed, opened or otherwise mispositioned, a locking mechanism which reliably and positively locks the operating handle in a selected position is required. Roberts U.S. Pat. No. 5,014,528 discloses a locking mechanism for quarter turn valves including an operating handle which is connected directly to the external end of the valve stem and is rotated to move the valve member between open and closed positions. The locking mechanism includes a pair of circumferentially-spaced lugs on the exterior of the body at locations corresponding to the open and closed positions. A slider member, mounted on an intermediate portion of the handle for reciprocative movement between locked and unlocked positions, carries a latch element having an opening for receiving the respective one of the lugs when the handle is either in the open or closed position. When the slider member is in a locked position, with the locking element in place, it restrains both rotational movement and axial movement of the handle relative to the stem.

A locking mechanism for valves employing an operating handle extension having the same capability is highly desirable.

SUMMARY OF THE INVENTION

A principal object of the invention is to provide a simply constructed locking mechanism for rotatable controls, such as quarter turn valves, having an extended operating handle connected to a rotatable control means, such as a valve member, and adapted to lock the control means or valve member in a selected position against unauthorized tampering.

Another principal object of the invention is to provide such a mechanism having the capability of being retrofitted on existing devices.

Other objects, aspects and advantages of the invention will become apparent to those skilled in the art upon reviewing the following detailed description, the drawings and appended claims.

In one aspect, the invention provides a locking mechanism for a valve including a valve member disposed in an internal flow passage in a valve body and movable between open and closed positions, a valve stem rotatably mounted in the valve body and having an internal part connected to the valve member and an operating portion accessible from the exterior of the valve body, an elongated extension having an inner and operably connected to the operating portion of the stem and an operating handle for rotating the valve between open and closed positions and including an inner end connected to the outer end of the extension, a grip portion and an intermediate portion.

The locking mechanism includes a bracket, preferably a one piece part, mounted on the valve body and having a flange spaced outwardly from the valve body, extending generally perpendicularly to the rotational axis of the stem and having an aperture through which the extension extends, a pair of circumferentially spaced projections extending radially outwardly relative to the stem axis at locations corresponding to the position of the intermediate portion of the handle when the valve member is in the open and closed positions and stop means on the bracket flange disposed in the rotational path of the inner end portion of the handle at locations corresponding to the open and closed positions and engageable by the inner end portion of the handle to limit movement of the valve member between open and closed positions. The locking mechanism also includes a slider member mounted on the intermediate portion of the handle for reciprocative movement between locked and unlocked positions and a latch element connected to slider member and having an opening for receiving the respective one of the projections when the handle is in the open or closed position and the slider is in the locked position. An opening in the latch element has laterally spaced side walls for engaging the side surfaces of the projections to restrain rotational movement of the handle when a slider member is in the locked position. This opening preferably also has a bottom wall for engaging the bottom surface of the projections to restrain axial movement of the handle relative to the stem when the slider member is in the locked position.

In another aspect, the invention provides a locking mechanism for a rotatable control device including a body housing a control means, a control shaft rotatably mounted in the body and having an internal portion connected to the control means and an operating portion accessible from the exterior of the body, and an elongated extension having an inner end operably connected to the operating portion of the control shaft, an operating handle for rotating the control means between first and second positions and including an inner end portion connected to the outer end of the extension.

The locking mechanism includes a bracket mounted on the device body and having a flange spaced outwardly from the device body and extending generally perpendicularly to the control shaft axis and having a pair of circumferentially spaced projections extending radially outwardly relative to the control shaft axis at locations corresponding to the position of the handle when the control member is in the first and second positions and stop means on this flange disposed in the rotational path of the inner end of the handle at locations corresponding to the first and second positions and engagable by the inner end portion of the handle to limit rotation of the control means between the first and second positions. The locking mechanism also includes a slider member mounted on an intermediate portion of the handle for reciprocative movement between locked and unlocked positions and a latch element connected to the slider member and having an opening for receiving the respective one of the projections when the handle is in the first or second position and the slider member is in the locked position. The latch element is arranged and functions in the manner described above.

In a preferred embodiment, the inner end portion of the handle includes a finger extending inwardly toward the body and the stop means comprises an arcuate slot in the bracket flange receiving the finger and having opposed end walls at locations corresponding to the open and closed positions for a valve and first and second positions for a rotatable control device. This finger engages the opposite ends of the arcuate slot to limit rotational movement of the valve member or the control means.

Means for preventing the slider member from being moved from the locked position can be provided. In a preferred embodiment, such means includes an aperture in an intermediate portion of the handle adjacent to slider member when it is in the locked position for receiving a locking member, such as a shackle of a padlock, which is engaged by the slider member when movement thereof from the locked position is attempted.

BRIEF DESCRIPTION OF THE DRAWINGS

FIG. 1 is a perspective view of a ball valve including an extended handle incorporating the invention.

FIG. 2 is a side sectioned view (except for the gripping portion of the handle) of the valve illustrated in FIG. 1.

FIG. 3 is a top plan view of the ball valve illustrated in FIGS. 1 and 2.

FIG. 4 is a perspective view the slider member.

FIG. 5 is a top plan view similar to FIG. 3 illustrating an alternate arrangement of the slider element.

FIG. 6 is fragmentary, partially sectioned side view of the handle arrangement illustrated in FIG. 5 with the slider member in the locked position.

DESCRIPTION OF THE PREFERRED EMBODIMENTS

Locking mechanisms embodying the invention can be adapted for a wide variety of controls including a rotatable control shaft carrying a control means and a manually operated handle connected to the control shaft, via an extension, for rotational movement of the control means, such as rheostats, potentiometers, variable compactors, control cable operators and the like. It is particularly adaptable for manually-operated quarter turn valves, such as ball valves, butterfly valves and plug valves, and will be described in connection with a ball valve.

Illustrated in the drawings, is a ball valve 10 including a body 12 defining an internal flow passage 14 extending therethrough and an external boss 16. The opposite ends 18 and 20 of the body 12 are internally threaded for connection in a piping system (not illustrated).

Disposed inside the body 12 is a rotatable valve member consisting of a ball 22 having a central opening 24. The ball 22 is mounted on valve seats 26 for rotational movement between an open position wherein the opening 24 is aligned with the flow passage 14 as illustrated in FIG. 2 and a closed position wherein the opening 24 is rotated 90° to the position illustrated in FIG. 2 and the ball 22 blocks flow through the flow passage 14.

A stem 28 is journalled in the boss 16 via a bearing sleeve 30 held in place by a threaded retainer 32 surrounding the stem 28 and threaded into the boss 16. The stem 28 is rotatable about a rotational stem axis 34 and has an internal end portion 36 connected to the ball 22 and an external end portion 38 which is accessible from the exterior of the valve body 12. In the specific embodiment illustrated, the external end portion 38 projects outwardly from the boss 16 and has a terminal part 40.

The ball 22 is moved back and forth between the full opened and closed positions by rotating the stem 28 90° about the stem axis 34 with an operating handle 42 including an inner end portion 44, a grip portion 46 and an intermediate portion 48. The handle 42 is connected to the terminal part 40 of the stem 28 via an elongated extension 50. The extension has a sufficient length, e.g., 2, 3, 4, 6, etc. inches, to locate the handle 42 outside insulation encasing the piping system (not shown) or in a more accessible area. More specifically, the extension 50 preferably is generally cylindrical to minimize snagging of surrounding insulation and has a lower end 52 which is suitably connected to the terminal part 40 of the stem 28 to provide common rotation of the extension 50 and the stem 28 about the stem axis 34. In the specific embodiment illustrated, the lower end 52 of the extension 50 has a threaded female aperture 54 for threading the extension 50 onto the terminal part 40 of the valve stem 28 and diametrically opposed set screws 56 in the lower end 52 are tightened against the flat surfaces 58 of the terminal stem part 40 to retain the extension 50 in place. The upper end 60 of the extension 50 has a necked down portion 62 and the handle 42 is connected to the outer end of the necked down portion 62 as described in more detail below.

Movement of the handle 42 about the stem axis 34 is controlled by a bracket 64 mounted on the valve body 12. The bracket 64 has an inner flange or feet 66, an outer flange 68 spaced outwardly from the inner flange 66 and extending generally perpendicularly to the stem axis 34 and a web section 70 spaced radially outwardly from the extension 50 and interconnecting the inner and outer flanges 66 and 68.

The inner flange 66 has a pair of laterally spaced apertures which are alignable with threaded apertures in the valve body 12 and the bracket 64 is fastened to the valve body 12 by a pair of bolts 72 or the like extending through the inner flange apertures and threaded into the valve body apertures. The apertures in the inner flange 66 can be slotted or several different apertures at different spacings can be provided in the inner flange 66 so that the bracket 64 can be mounted on valves having mounting apertures of different spacing and/or size.

The outer flange 68 has an aperture 74 which receives the necked down portion 62 of the extension 50. Radial movement of the extension 50 relative to the outer flange 68 can result in the handle 42 being accidentally moved past the full closed position to a partially opened position or past the full open position to a partially closed position. To minimize this, an annular sleeve 76 of low friction material, such as PTFE, disposed between the aperture 74 and the outer surface of the necked down portion 62, acts to both stabilize the extension 50 against radial movement relative to the outer flange 68 and as a bearing surface for the extension 50 during rotation of the extension 50 relative to the outer flange 68.

The outer flange 68 also includes an arcuate slot 78 which extends in the rotational path of and receives an inturned finger 80 on the inner end portion 44 of the handle 42 during movement between open and closed positions. As best shown in FIG. 3, the slot 78 has opposed ends 82 and 84 which are engaged by the finger 80 and serve as stops for limiting movement of the handle 42 in the open and closed positions, respectively.

The inner end portion 44 of the handle 42 is suitably mounted on the outer end portion 60 of the extension 50. In the specific embodiment illustrated, the outer end portion 60 of the extension 50 has a terminal part 86 which is threaded and has opposed flat surfaces 88 (FIG. 3). The inner end portion 44 of the handle 42 has a generally rectangular slot 90 (FIG. 2) for receiving the terminal part 86 of the extension 50. The handle 42 is held in place on the extension 50 by a nut 92 threaded onto the terminal part 86 of the extension 50.

A locking mechanism is provided for preventing the handle 42 from being moved from the full open or full closed position and preferably also preventing the handle 42 from being lifted off the extension 50 even though the nut 92 has been removed.

The locking mechanism includes a pair of lugs or projections 94 and 96 (FIG. 3) on the outer flange 68 of the bracket 64 and spaced circumferentially relative to the stem axis 34. The projections 94 and 96 extend radially outwardly relative to the stem axis 34 and are at locations corresponding to the location of the intermediate portion 48 of the handle 42 when the ball 22 is in the full open position and the full closed position, respectively. Each projection 94 and 96 has a generally flat opposed side surfaces 98 and 100 (FIG. 3) and a bottom surface 102 (FIG. 2).

The locking mechanism also includes a slider member 104 enveloping and slidably mounted on the intermediate portion 48 of the handle 42 for reciprocative movement between a locked position illustrated by solid lines in FIG. 2 and a retracted or unlocked position illustrated by dashed lines in FIG. 2. Connected to the slider member 104 is a latch element 106 which extends inwardly toward the valve body 12. In the embodiment illustrated, the latch element 106 is formed an integral part of the slider member 104 and extends generally parallel to the stem axis 34.

The latch element 106 includes an opening 108 (FIG. 4) which receives the projection 94 when the handle 42 is in the open position and the slider member 104 is in the locked position, as illustrated by solid lines in FIG. 2, and receives the projection 96 when the handle 42 is in the closed position, as illustrated by dashed lines in FIG. 3, and the slider member 104 is in the locked position. The latch element opening 108 has laterally spaced side walls 110 and 112 and a bottom wall 114. The spacing between the side walls 110 and 112 is slightly larger than the width of the projections 94 and 96.

When the handle 42 is in the open position and the slider member 104 is in the locked position and an attempt is made to close the valve, the side wall 110 of the latch opening 108 engages the side surface 98 of the projection 94 to prevent appreciable movement of the handle 42 in the closing direction. When the handle 42 is in the closed position and the slider member 48 is in the locked position and an attempt is made to open the valve, the side wall 112 of the latch element opening 108 engages one side surface 100 of the projection 96 to prevent appreciable movement of the handle 42 in the opening direction. When the handle 42 is in either position and the slider member 104 is in the locked position and an attempt is made to lift the handle 42 off the terminal end 60 of the extension 50, after the nut 92 has been removed, the bottom wall 114 of the latch element opening 108 engages the bottom surface 102 of the respective projection 94 and 96 to prevent appreciable outward axial movement of the handle 42 relative to the extension 50.

When the slider member 104 is slipped up the intermediate portion 48 of the handle 42 to the unlocked position, the latch element 106 is spaced away from the projections 94 and 96 and the handle 42 can be freely rotated between open and closed positions.

In the specific embodiment illustrated in FIGS. 1–3, the intermediate portion 48 of the handle 42 is inclined outwardly relative to the body (i.e., extends at an acute angle to the stem axis 34). With this arrangement, the slider member 104 is more or less biased by gravity toward the locked position when the valve is oriented so that the stem axis 34 is generally perpendicular to the ground.

The locking mechanism preferably includes means for positively locking the slider member 104 in the locked position until it is desired to change the valve position. While very suitable arrangements can be used for this purpose, in the specific embodiment illustrated, the intermediate portion 48 of the handle 42 includes an aperture 114 located adjacent the outer edge 116 of the slider member 104 when it is in the locked position. The aperture 114 is sized to receive a pin or the like which is locked in place. For example, it can be sized to receive the shackle of a padlock (not shown).

FIGS. 5 and 16 illustrate an alternate embodiment including means for biasing the slider member toward the locked position irrespective of the orientation of the handle 42. Roberts U.S. Pat. No. 5,183,073 ("'073 Patent"), which is incorporated herein by reference, discloses an arrangement particularly suitable for this purpose. Such an arrangement includes a compression spring 120 disposed in an elongated slot 122 in the intermediate portion 48 of the handle 42 with one end bearing against one end of the slot 122 and the other end bearing against a pin or rivet 124 carried by the slider member 104a so that the spring 120 biases a slider member 104a toward the stem axis 34. The slider member 104a can include a tang 126, like the tang 115 illustrated in FIGS. 2, 4 and 5 of the '073 Patent, to facilitate movement of the slider member 104a to the unlocked position and otherwise constructed in the manner described in the '073 Patent.

In the specific embodiment illustrated, the bracket 64 includes an inturned, wing-like panel section 130 (FIGS. 1 and 2) connected to and extending from each of the opposed side edges of the web section 70 inwardly toward the extension 50. The panel sections 130 define a confined space into which additional insulation can be stuffed after a bracket/extension handle assembly has been installed. The panel sections 130 assist in holding the added insulation in place. If such a capability is not desired, the panel sections 130 can be omitted.

The web section 70 can include an opening 132 (FIGS. 1 and 2) for permitting access to the set screws 56 with an allen wrench or the like.

The bracket 64 preferably is formed as a one piece part by stamping or the like in order to minimize material and manufacturing costs.

From the foregoing description, one skilled in the art can easily ascertain the essential characteristics of the invention and, without departing from the spirit and scope thereof, make various changes and modifications to adapt it to various usages.

I claim:

1. A valve including a valve body having a flow passage extending therethrough;

a valve member disposed in said flow passage and movable between an open position to permit flow through said flow passage and a closed position to prevent flow through said flow passage;

a valve stem mounted in said valve body for rotation about a stem axis and having an internal portion connected to said valve member and an operating portion accessible from the exterior of said valve body;

an elongated extension having an inner end operably connected to the operating portion of said stem for common rotation therewith and an outer end spaced outwardly from said body;

an operating handle for rotating said valve member between said open and closed positions, said operating handle including an inner end portion connected to the outer end of said extension, a grip portion and an intermediate portion;

a bracket mounted on said body and having a flange spaced outwardly from said body and extending generally perpendicularly to said stem axis, said flange including a aperture through which said extension extends and a pair of circumferentially spaced projections extending radially outwardly relative to said stem axis at locations corresponding to the position of the intermediate portion of said handle when said valve member is in said open and closed positions;

stop means on said outer flange disposed in the rotational path of the inner end portion of said handle at locations corresponding to said open and closed positions and engageable by the inner end portion of said handle to limit movement of said valve member between said open and closed positions;

a slider member mounted on the intermediate portion of said handle for reciprocative movement between locked and unlocked positions; and a latch element connected to said slider member and extending toward said body, said latch element having an opening for receiving the corresponding one of said projections when said handle is in one of said open and closed positions and said slider member is in the locked position, said opening having laterally spaced side walls for engaging said projections to restrain rotational movement of said handle when said handle is in one of said open and closed positions and said slider member is in the locked position, said latch element being spaced away from said projections when said slider member is in the unlocked position.

2. A valve according to claim 1 wherein said projections have a bottom surface; and said latch element opening has a bottom which engages the bottom surface of said projections to prevent substantial axial movement of said handle relative to said extension when said handle is in one of said open and closed positions and said slider member is in the locked position.

3. A valve according to claim 1 wherein the inner end portion of said handle includes a finger extending inwardly toward said body; and said stop means comprises an arcuate slot in said outer flange, receiving said finger and having opposed ends at locations corresponding to said open and closed position which are engaged by said finger to limit rotational movement of said valve member.

4. A valve according to claim 3 wherein said bracket is one piece.

5. A valve according to claim 4 wherein said bracket includes a web section connected to said flange and extending toward said valve body, said web section having opposed side edges; and an inturned panel section connected to and extending from each of said side edges inwardly toward said extension.

6. A valve according to claim 1 including a low friction annular bearing disposed in the aperture in said flange through which said extension extends and engaging said extension to minimize radial movement of said extension relative to said flange.

7. A valve according to claim 3 including locking means for preventing movement of said slider member from said locked position.

8. A valve according to claim 1 wherein said valve is a quarter turn valve.

9. A valve according to claim 8 wherein said quarter turn valve is a ball valve.

10. A valve according to claim 1 wherein said locking means includes the intermediate portion of said handle having an aperture located adjacent said slider member when said slider member is in said locked position for receiving a locking member which is engaged by said slider member when movement away from said locked position is attempted.

11. A rotatable control devices including a body housing a control means;

a control shaft mounted in said body for rotation about a rotational axis and having an internal portion connected to said control means and an operating portion accessible from the exterior of said body;

an elongated extension having an inner end operably connected to the operating portion of said control shaft for common rotation therewith and an outer end spaced outwardly from said body;

an operating handle for rotating said control means between first and second positions, said operating handle including an inner end portion connected to the outer end of said extension, a grip portion and an intermediate portion;

a bracket mounted on said body and having a flange spaced outwardly from said body and extending generally perpendicularly to said rotational axis, said flange including a aperture through which said extension extends and a pair of circumferentially spaced projections extending radially outwardly relative to said rotational axis at locations corresponding to the position of the intermediate portion of said handle when said control member is in said first and second positions;

stop means on said outer flange disposed in the rotational path of the inner end portion of said handle at locations corresponding to said first and second positions and engageable by the inner end portion of said handle to limit rotation of said control means between said first and second positions;

a slider member mounted on the intermediate portion of said handle for reciprocative movement between locked and unlocked positions;

a latch element connected to said slider member and having an opening for receiving the corresponding one of said projections to restrain rotational movement of said handle when said handle is in one of said first and second positions and said slider member is in the locked position, said latch element being spaced away from said projections when said slider member is in the unlocked position.

12. A control device according to claim 11 wherein the inner end portion of said handle includes a finger extending inwardly toward said body; and said stop means comprises an arcuate slot is said flange, receiving said finger and having opposed ends at locations corresponding to said first and second portions which are engaged by said finger to limit rotational movement at said control means.

13. A control device according to claim 12 wherein said bracket is one piece.

14. A control device according to claim 12 including a low friction annular bearing disposed in the aperture in said flange through which said extension extends and engaging said extension to minimize radial movement of said handle relative to said flange.

15. A control device according to claim 12 including locking means for preventing movement of said slider member from said locked position.

16. A control device according to claim 15 wherein said locking means includes the intermediate portion of said handle having an aperture located adjacent said slider member when said slider member is in said locked position for receiving a locking member which is engaged by said slider member when movement away from said locked position is attempted.

* * * * *